2,964,502

PROCESS FOR PRODUCING RESINS FROM LIQUID DIENE POLYMERS AND POLYTHIOLS

Charles E. Wheelock, Bartlesville, Okla., assignor to Phillips Petroleum Company, a corporation of Delaware No Drawing. Filed Aug. 26, 1957, Ser. No. 680,387

3 Claims. (Cl. 260—79)

This invention relates to resins from liquid diene polymers and polythiols.

Liquid diene polymers, such as liquid polybutadiene, are well known in the art and have been used for many purposes. It is known that such liquid polymers are valuable as coating compositions and that they can be cured in film or massive form to hard, solid materials, the word "solid" being used herein to mean a substance which does not flow. Many different curing systems are known, these curing systems ranging from simple heating to reaction with additional materials.

This invention is based upon the discovery that polythiols can be used to produce solid materials from liquid diene polymers.

The following are objects of my invention.

An object of my invention is to produce resins from liquid diene polymers and polythiols. A further object of my invention is to provide rubbery and resinous products prepared by reacting liquid diene polymers with polythiols. A further object of my invention is to provide porous, foamed, or spongy materials from conjugated diene polymers and polythiols. A further object of my invention is to provide a method for producing solid materials from liquid polybutadiene and polythiols.

Other objects and advantages of my invention will become apparent to one skilled in the art upon reading the accompanying disclosure.

As stated, I have discovered that rubbery or resinous products can be obtained by reacting liquid polymers of conjugated dienes with polythiols. The products are useful for the preparation of coatings, laminates, castings, motor mountings, and moldings. They are substantially insoluble in common organic solvents and, when fully cured, are stable at high temperatures. They also possess good electrical resistance. I believe that this is a new method for the production of rubbery materials from the liquid polymers. These rubbery materials are soft, flexible, and have a Shore A hardness of about 20 to 80.

The liquid polymers useful in my invention have viscosities within the range of 100 to 6000 Saybolt Furol seconds at 100° F. Included are homopolymers and copolymers of conjugated dienes containing 4 to 6 carbon atoms per molecule. These dienes include 1,3-butadiene, isoprene, piperylene, and 2,3-dimethyl-1,3-butadiene, and mixtures thereof. Copolymers prepared by polymerizing a major amount of one or more conjugated diene with a minor amount of monomers polymerizable therewith are also suitable, these copolymerizable monomers containing the group $CH_2=C<$ associated with an activating group, illustrative compounds being acrylonitrile, 2-methyl-5-vinylpyridine, styrene, and methyl-styrene. Other materials copolymerizable with the conjugated diene will be immediately suggested to those skilled in the art because of the wide variety of such materials which have been copolymerized.

Mass or emulsion polymerization can be used for the production of these liquid polymers, recipes therefor being well known. A method which is preferred by me is mass polymerization in the presence of finely divided sodium as described in Crouch 2,631,175. Typical properties of liquid polybutadiene prepared according to the method of Crouch are

| | |
|---|---|
| Gardner color | 10 |
| Viscosity, SFS at 100° F. | 1500 |
| Specific gravity, 20° | 0.91 |
| Double bonds per $C_4$ unit | 0.8 |
| Refractive index, $n_D^{20}$ | 1.519 |
| Iodine number | 385 |

The mercaptans or thiols suitable for reaction with these liquid polymers have two or more reactive —SH groups. The preferred polythiols are those which are liquids and the solids which are readily miscible with or soluble in the liquid polymer at the temperatures used for curing the resin. These compounds include the aliphatic polythiols such as 1,2-ethanedithiol; 1,3-propanedithiol; 1,2,3-propanetrithiol; 2-methyl-2,4-pentandithiol; 1,6-octanedithiol; 1,6-hexenedithiol; 1,10-decanedithiol; 1,18-octadecanedithiol; 1,6-hexanedithiol; 1,20-eicosanedithiol; 1,30-triacontandithiol; 1,38-octatriacontanedithiol and 3,6-dioxa-1,8-octanedithiol. In addition, the polythiol derivatives of araliphatic, aromatic, and heterocyclic compounds can be utilized, such as 1,4-di-(3-mercaptophenyl)butane, 2-mercaptoethyl 3-(2-mercaptoethyl) phenyl sulfide, dithioresorcinol, and 3-(2-mercaptoethyl)-6-(mercaptomethyl)pyridine. In one embodiment of this invention, the thiol is generated in situ by addition of appropriate reagents to the liquid polymer. For example, 2,5-dimercapto-1,3,4-thiadiazole can be generated by reaction of one mol of hydrazine with two mols of carbon disulfide according to the equation

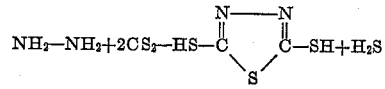

The gas released by this reaction can act to give a foamed structure.

When this method of in situ generation of the polythiol is used, substantially equivalent amounts of hydrazine and the carbon disulfide can be used although it is preferable to use a 10 to 20 percent by weight excess of the carbon disulfide based upon the stoichiometric amount required.

The polythiols can be applied above or in admixture. The polymers in the absence of the thiols are thermosetting but the polythiols are used to accelerate the rate of cure and to modify the properties of the product. With these liquid polymers and with thiols having an equivalent weight (molecular weight divided by the number of —SH groups) not over 300, the amount of thiol is in the range of 2 to 60 parts by weight per 100 parts of the polymer. Unreacted polythiol can be removed subsequent to the reaction, if desired, by heating.

The liquid polymer or the polymer-thiol blends can be admixed with fillers such as clay, asbestos, glass, mica, carbon black, wood flour, cloth, sand and other essentially inert, non-reactive materials. These blends can be thermoset to give solid structures having a high strength.

Solvents, such as pentane, hexane, xylene, toluene, and cyclohexane, which have a boiling point below about 150° C. can be utilized when desired, for example, to achieve a lowering of the viscosity to facilitate brush and spray applications. In addition, liquid monomers such as styrene which may be reactive with the polymer or mercaptan can be beneficial. Curing rate accelerators, particularly the peroxides and acidic reagents, such as t-butyl peroxide, trichloroacetic acid and phosphoric acid can be used in small amounts, normally less than about 3 percent by weight of the polymer.

The blends of polymer and thiol, with or without fillers, catalysts, etc. can be cured at temperatures to at least 300° C. and commonly at temperatures in the range of 50 to 200° C. The curing period can be as short as a few minutes to several hundred hours. To minimize loss of any volatile reactants, the initial stages of cure can be conducted at a low temperature, and the temperature increased during the final stages of cure. As an alternative procedure, the structures can be cured in closed containers to prevent loss of the reactants.

As will be illustrated by the examples, the relative amount of the thiol to mercaptan and the time and temperature of cure can effect the type of product. Thus, rubbery products as well as hard or brittle resins can be obtained. Low cure temperatures and low thiol concentrations are conducive to formation of rubbery products. The products generally have an amber brown color and high gloss surfaces can be produced. The products are odorless, indicating the absence of low molecular weight volatile products.

EXAMPLE I

Butadiene was polymerized in the presence of finely divided sodium according to the method of the previously-mentioned Crouch patent, the liquid polymer having a viscosity of 1500 Saybolt Furol seconds at 100° F. Portions of this liquid polymer were mixed with 1,2-ethanedithiol in varying amounts and each of the liquid mixtures was cured in open aluminum molds for 90.4 hours at 130° C. The products were then cooled at room temperature (about 25° C.), and the Shore hardness was measured, Shore A hardness being the test for rubbery materials and Shore D hardness for hard resinous materials. These measurements were made according to ASTMD 676-55T. Subsequently, the materials were heated at 188° C. for 73 hours. After cooling to room temperature, the Shore D hardness of each specimen was determined. The results of these runs are set forth in Table I.

Table I

| Run No. | Parts by Weight | | After 90.5 hr. at 130° C. | | Shore D hardness after post-cure at 188° C. |
|---|---|---|---|---|---|
| | Polybutadiene | 1,2-ethanedithiol | Shore A | Shore D | 73 hr. |
| 1 | 100 | 0 | 0 | | 76 |
| 2 | 100 | 10 | 62 | | 91 |
| 3 | 100 | 20 | 76 | | 87 |
| 4 | 100 | 30 | above 88 | about 12 | 89 |
| 5 | 100 | 40 | above 88 | 37 | 90 |

These results show that the curing of these liquid compositions can be very appreciably accelerated by this use of the polythiols. After curing at 130° C. for 90.5 hours, the products prepared with 10 and 20 parts of 1,2-ethanedithiol per 100 parts of the liquid polymer produced rubbery structures while higher amounts of the dithiol gave resinous products. Upon further heating at 188° C., hard resinous products were formed, it being pointed out that after 73 hours the products were harder than the control in which no 1,2-ethanedithiol was used. The products were brown in color and had smooth, glossy surfaces.

EXAMPLE II

Runs were made in a manner similar to those described in Example I, the same liquid polybutadiene being used, except that the dithiol was formed in situ by reacting hydrazine and carbon disulfide, using a slight excess of the carbon disulfide. In each run the hydrazine and carbon disulfide were mixed with the polymer and the mixtures were cured. Upon adding the hydrazine and carbon disulfide to the liquid polymer there was an immediate evolution of heat, the odor of hydrogen sulfide, and the formation of a solid precipitate in the polymer. Due to the evolution of hydrogen sulfide gas during the curing period, foamed products were formed. After 90.5 hours at 130° C. Shore A hardness was determined in the manner set forth in Example 1. The results are shown in Table II.

Table II

| Run No. | Parts by Weight | | | After 90.5 hr. at 130° C. |
|---|---|---|---|---|
| | Polybutadiene | Hydrazine | Carbon disulfide | Shore A |
| 1 | 100 | 0.0 | 0.0 | 0 |
| 2 | 100 | 1.2 | 6.4 | 49 |
| 3 | 100 | 2.4 | 12.8 | |
| 4 | 100 | 3.6 | 19.2 | |
| 5 | 100 | 4.8 | 25.6 | |

These data again show accelerated cure when a dithiol is present in the composition. It is not possible to obtain accurate Shore A hardness figures for runs 3, 4 and 5 because of the foamed nature of the products but these were solid products.

EXAMPLE III

Additional runs were made using the liquid polybutadiene of Example I, carbon disulfide and hydrazine being used to form the polythiol in situ. The products were cured in open molds for 128 hours at 150° C. Results of these runs are set forth in Table III.

Table III

| Run No. | Parts by Weight | | | Result |
|---|---|---|---|---|
| | Polybutadiene | Carbon disulfide | Hydrazine | |
| 1 | 100 | 0 | 0 | Liquid. |
| 2 | 100 | 5.5 | 1 | Tacky. |
| 3 | 100 | 11.0 | 2 | Rubbery. |
| 4 | 100 | 16.5 | 3 | Rubbery. |
| 5 | 100 | 27.5 | 5 | Rubbery. |

EXAMPLE IV

Run 5 of Example III was repeated except that, in addition to the ingredients of said run 5, 1.0 part of trichloroacetic acid was added as a catalyst. After heating, a rubbery product was obtained.

As many possible emboidments can be made of this invention without departing from the scope thereof, it is to be understood that all matter herein set forth is to be interpreted as illutsrative and not as unduly limiting the invention.

I claim:

1. The method of curing a liquid polymer of 1,3-butadiene, said liquid polymer having a ivscosity of 100 to 6000 Saybolt Furol seconds at 100° F. comprising incorporating in said liquid polymer 2,5-dimercapto-1,3,4-thiadiazole in an amount of 2 to 60 parts by weight per 100 parts of said polymer, said 2,5-dimercapto-1,3,4-thiadiazole being formed in situ by mixing with said polymer hydrazine and carbon disulfide, and heating the mixture to produce a solid product.

2. The method of curing a liquid polymer of 1,3-butadiene, said liquid polymer having a viscosity of 100 to 6000 Saybolt Furol seconds at 100° F. comprising incorporating in said liquid polymer 2,5-dimercapto-1,3,4-thiadiazole in an amount of 2 to 60 parts by weight per 100 parts of said polymer, said 2,5-dimercapto-1,3,4-thiadiazole being formed in situ by mixing with said polymer hydrazine and carbon disulfide and, as a curing rate accelerator, trichloroacetic acid in an amount not exceeding 3 percent by weight of said polymer, and heating the mixture to produce a solid product.

3. The method of curing a liquid polymer of a conjugated diene containing 4 to 6 carbon atoms, said liquid polymer having a viscosity of 100 to 6000 Saybolt Furol seconds at 100° F. comprising incorporating in said liquid polymer, 2,5-dimercapto-1,3,4-thiadiazole in an amount of 2 to 60 parts by weight per 100 parts of said polymer, said 2,5-dimercapto-1,3,4-thiadiazole being formed in situ by mixing with said polymer hydrazine and carbon disulfide, and heating the mixture to produce a solid product.

References Cited in the file of this patent

UNITED STATES PATENTS

| 2,396,957 | Lazier et al. | Mar. 19, 1946 |
| 2,631,175 | Crouch | Mar. 10, 1953 |

OTHER REFERENCES

Hull et al.: Industrial and Engineering Chemistry, vol. 40, No. 3, March 1948, pages 513–517.